US010601579B2

(12) United States Patent
Joye et al.

(10) Patent No.: US 10,601,579 B2
(45) Date of Patent: Mar. 24, 2020

(54) PRIVACY PRESERVING COMPARISON

(71) Applicant: NXP B.V., Eindhoven (NL)

(72) Inventors: Marc Joye, San Jose, CA (US); Fariborz Salehi, San Jose, CA (US)

(73) Assignee: NXP B.V., Eindhoven (NL)

( * ) Notice: Subject to any disclaimer, the term of this patent is extended or adjusted under 35 U.S.C. 154(b) by 141 days.

(21) Appl. No.: 15/849,420

(22) Filed: Dec. 20, 2017

(65) Prior Publication Data

US 2019/0190694 A1 Jun. 20, 2019

(51) Int. Cl.
*H04L 9/00* (2006.01)
*H04L 9/14* (2006.01)
*G06F 17/10* (2006.01)

(52) U.S. Cl.
CPC .............. *H04L 9/008* (2013.01); *H04L 9/005* (2013.01); *H04L 9/14* (2013.01); *G06F 17/10* (2013.01); *H04L 2209/08* (2013.01)

(58) Field of Classification Search
CPC combination set(s) only.
See application file for complete search history.

(56) References Cited

U.S. PATENT DOCUMENTS 9,942,032 B1 * 4/2018 Kornaropoulos ....... H04L 9/008
2019/0190714 A1 6/2019 Joye et al.

OTHER PUBLICATIONS

Veugen, T., Blom, F., de Hoogh, S. J., & Erkin, Z. (2015). Secure comparison protocols in the semi-honest model. IEEE Journal of Selected Topics in Signal Processing, 9(7), 1217-1228. [online][retrieved on Aug. 27, 2019]. Retrieved from: IEEEXplore (Year: 2015).*

(Continued)

*Primary Examiner* — Jung W Kim
*Assistant Examiner* — Sangseok Park

(57) ABSTRACT

A method for performing a secure comparison between a first secret data and a second secret data, including: receiving, by a processor of a first party, $\ell$ encrypted bits of the second secret data y from a second party, where $\ell$ is an integer; computing the Hamming weight h of first secret data x, wherein x has $\ell$ bits; computing the value of a first comparison bit $\delta_A$ such that $\delta_A=0$ when $h > \lfloor \ell/2 \rfloor$, $\delta_A=1$ when $h < \lceil \ell/2 \rceil$, and $\delta_A$ is randomly selected when $h = \ell/2$; forming a set of $\lfloor \ell/2 \rfloor$ indexes $\mathcal{L}$ that includes at least the indexes i where $x_i = \delta_A$; selecting random invertible scalars $r_i$ for each i in $\mathcal{L}$ and computing $[\![c^*_i]\!] = ([\![1+(1-2\delta_A)x_i]\!] \cdot [\![y_i]\!]^{2\delta_A-1} \cdot (\prod_{j=i+1}^{\ell-1} [\![x_j \oplus y_j]\!] )^{r_i}$ wherein $[\![w]\!]$ denotes the homomorphic encryption of w using a cryptographic key of the second party; selecting random invertible scalars $r_{-1}$ and computing $[\![c^*_{-1}]\!] = ([\![\delta_A]\!] \cdot \prod_{j=0}^{\ell-1} [\![x_j \oplus y_j]\!])^{r_{-1}}$; transmitting ciphertexts $[\![c^*_i]\!]$ in a random order to the second party.

20 Claims, 2 Drawing Sheets

(56) References Cited

OTHER PUBLICATIONS

Boneh et al., Evaluating 2-DNF formulas on ciphertexts. J. Kilian, editor, Theory of Cryptography (TCC 2005), vol. 3378 of Lecture Notes in Comp. Sci., pp. 325-341.
Wu et al., Privately evaluating decision trees and random forests, Proc. on Privacy Enhancing Technologies, 2016(4):33.
Damgård et al. 'Efficient and secure comparison for on-line auctions'. Intl J. of Cryptography (and correction) 1(4): 323-324 (2009).
Damgård et al. Homomorphic encryption and secure comparison. Intl J. of Appl Cryptography, 1(1):22-31,2008.
T.Veugen, Improving the DGK comparison protocol, 2012 IEEE Intl Workshop on Information Forensics and Security (WIFS 2012), pp. 49-54, IEEE, 2012.
Erkin, Privacy-Preserving Face Recognition, Privacy Enhancing Technologies (PETS 2009) vol. 5672 of Lect.Notes in Comp. Sci., pp. 235-253 (2009).
Barni, Mauro et al.; "Privacy-preserving Fingercode Authentication;" Proceedings of the 12th ACM Workshop on Multimedia and Security; Roma, Italy; Sep. 9-10, 2010; doi>10.1145/1854229.1854270.
Bunn, Paul et al.; "Secure Two-Party k-Means Clustering;" Proceedings of the 14th ACM Conference on Computer and Communications Security (CCS'07); Alexandria, Virginia, Oct. 28-Nov. 2, 2007; doi>10.1145/1315245.1315306.
Erkin, Zekeriya et al.; "Generating Private Recommendations Efficiently Using Homomorphic Encryption and Data Packing;" IEEE Transactions on Information Forensics and Security, vol. 7, No. 3, pp. 1053-1066; Jun. 2012; Publication Date: Mar. 13, 2012; Doi: 10.1109/TIFS.2012.2190726.
Franz, Martin et al.; "Towards Secure Bioinformatics Services;" Proceedings of the 15th International Conference on Financial Cryptography and Data Security (FC 2011), Feb. 28-Mar. 4, 2011, Gros Islet, St. Lucia; vol. 7035 of Lecture Notes in Computer Science; pp. 276-283.
Lin, Hsiao-Ying et al.; "An Efficient Solution to the Millionaires' Problem Based on Homomorphic Encryption;" Proceedings of the Third International Conference on Applied Cryptography and Network Security (ACNS 2005), vol. 3531 of Lecture Notes in Computer Science, pp. 456-466; New York, NY, Jun. 7-10, 2005; doi>10.1007/11496137_31.
Nikolaenko, Valeria et al.; "Privacy-Preserving Matrix Factorization;" Proceedings of the 2013 ACM SIGSAC Conference on Computer & Communications Security (CCS 2013), pp. 801-812; Berlin, Germany, Nov. 4-8, 2013; doi>10.1145/2508859.2516751.
Troncoso-Pastoriza, Juan Ramón et al.; "Secure Adaptive Filtering;" IEEE Transactions on Information Forensics and Security, vol. 6, Issue 2, Jun. 2011; Publication Date: Jan. 31, 2011; pp. 469-485; DOI: 10.1109/TIFS.2011 .2109385.

\* cited by examiner

PRIVACY PRESERVING COMPARISON

TECHNICAL FIELD

Various exemplary embodiments disclosed herein relate generally to a method and apparatus for performing a privacy preserving comparison.

BACKGROUND

Protocols have been developed for comparing private values using homomorphic encryption. Embodiments improving upon the state of the art will be described below.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for performing a secure comparison between a first secret data and a second secret data, including: receiving, by a processor of a first party, $\ell$ encrypted bits of the second secret data y from a second party, where $\ell$ is an integer; computing the Hamming weight h of first secret data x, wherein x has $\ell$ bits; computing the value of a first comparison bit $\delta_A$ such that $\delta_A=0$ when $h > \lfloor \ell/2 \rfloor$, $\delta_A=1$ when $h < \lceil \ell/2 \rceil$, and $\delta_A$ is randomly selected when $h = \ell/2$; forming a set of $\lfloor \ell/2 \rfloor$ indexes $\mathcal{L}$ that includes at least the indexes i where $x_i = \delta_A$; selecting random invertible scalars $r_i$ for each i in $\mathcal{L}$ and computing $[\![c^*_i]\!] = ([\![1+(1-2\delta_A)x_i]\!] \cdot [\![y_i]\!]^{2\delta_A-1} \cdot (\Pi_{j=i+1}^{\ell-1} [\![x_j \oplus y_j]\!]))^{r_i}$ wherein $[\![w]\!]$ denotes the homomorphic encryption of w using a cryptographic key of the second party; selecting random invertible scalars $r_{-1}$ and computing $[\![c^*_{-1}]\!] = ([\![\delta_A]\!] \cdot \Pi_{j=0}^{\ell-1} [\![x_j \oplus y_j]\!])^{r_{-1}}$; transmitting ciphertexts $[\![c^*_i]\!]$ in a random order to the second party.

Further various embodiments relate to a non-transitory machine-readable storage medium encoded with instructions for performing a secure comparison between a first secret data and a second secret data, including: instructions for receiving, by a processor of a first party, $\ell$ encrypted bits of the second secret data y from a second party, where $\ell$ is an integer; instructions for computing the Hamming weight h of first secret data x, wherein x has $\ell$ bits; instructions for computing the value of a first comparison bit $\delta_A$ such that $\delta_A=0$ when $h > \lfloor \ell/2 \rfloor$, $\delta_A=1$ when $h < \lceil \ell/2 \rceil$, and $\delta_A$ is randomly selected when $h = \ell/2$; instructions for forming a set of $\lfloor \ell/2 \rfloor$ indexes $\mathcal{L}$ that includes at least the indexes i where $x_i = \delta_A$; instructions for selecting random invertible scalars $r_i$ for each i in $\mathcal{L}$ and computing $[\![c^*_i]\!] = ([\![1+(1-2\delta_A)x_i]\!] \cdot [\![y_i]\!]^{2\delta_A-1} \cdot (\Pi_{j=i+1}^{\ell-1} [\![x_j \oplus y_j]\!]))^{r_i}$ wherein $[\![w]\!]$ denotes the homomorphic encryption of w using a cryptographic key of the second party; instructions for selecting random invertible scalars $r_{-1}$ and computing $[\![c^*_{-1}]\!] = ([\![\delta_A]\!] \cdot \Pi_{j=0}^{\ell-1} [\![x_j \oplus y_j]\!])^{r_{-1}}$; instructions for transmitting ciphertexts $[\![c^*_i]\!]$ in a random order to the second party.

Various embodiments are described, wherein when the second party sets a value of a second comparison bit $\delta_B$ based upon the decrypted $c^*_i$'s and wherein $\delta_A \oplus \delta_B = [x \le y]$.

Various embodiments are described, wherein when the second party sets a second comparison bit $\delta_B = 1$ when any one of the decrypted $c^*_i$'s is equal to zero.

Various embodiments are described, wherein when the second party sets a second comparison bit $\delta_B = 0$ when none of the decrypted $c^*_i$'s is equal to zero.

Various embodiments are described, wherein the encryption uses the Pallier cryptosystem.

Various embodiments are described, wherein the encryption uses the exponential variant of the ElGamal cryptosystem.

Various embodiments are described, further including receiving an encryption of the second comparison bit $\delta_B$ from the second party and computing $[\![\delta]\!] = [\![\delta_B]\!]$ when $\delta_A = 0$ and $[\![\delta]\!] = [\![1]\!] \cdot [\![\delta_B]\!]^{-1}$ when $\delta_A \ne 0$, wherein $\delta = [x \le y]$.

Further various embodiments relate to a method for performing a secure comparison between a first secret data and a second secret data, including: receiving, by a processor of a first party, encrypted second secret data $[\![y]\!]$ from a second party, wherein where $\ell$ is the number of bits in y and wherein $[\![y]\!]$ denotes the additive homomorphic encryption of y; choosing a random mask $\rho$ in $\{0,1\}^{\ell+\kappa}$, where $\kappa$ is a security parameter; computing $[\![z^\dagger]\!] = [\![y]\!] \cdot [\![x]\!]^{-1} \cdot [\![2^\ell + \rho]\!]$, wherein x is the first secret data having $\ell$ bits; sending $[\![z^\dagger]\!]$ to the second party; computing $x' = \rho \bmod 2^\ell$; receiving, by the processor of a first party, $\ell$ encrypted bits of y' from the second party, wherein y' is based upon $[\![z^\dagger]\!]$; computing the Hamming weight h of x'; computing the value of a first comparison bit $\delta'_A$ such that $\delta'_A = 0$ when $h > \lfloor \ell/2 \rfloor$, $\delta'_A = 1$ when $h < \lceil \ell/2 \rceil$, and $\delta'_A$ is randomly selected when $h = \ell/2$; forming a set of $\lfloor \ell/2 \rfloor$ indexes $\mathcal{L}$ that includes at least the indexes i where $x'_i = \delta'_A$; selecting random invertible scalars $r_i$ for each i in $\mathcal{L}$ and computing $[\![c^*_i]\!] = ([\![1+(1-2\delta'_A)x'_i]\!] \cdot [\![y'_i]\!]^{2\delta'_A-1} \cdot (\Pi_{j=i+1}^{\ell-1} [\![x'_j \oplus y'_j]\!]))^{r_i}$; selecting random invertible scalars $r_{-1}$ and computing $[\![c^*_{-1}]\!] = (\delta'_A \cdot \Pi_{j=0}^{\ell-1} [\![x'_j \oplus y'_j]\!])^{r_{-1}}$; transmitting ciphertexts $[\![c_i^*]\!]$ in a random order to the second party.

Further various embodiments relate to a non-transitory machine-readable storage medium encoded with instructions for performing a secure comparison between a first secret data and a second secret data, including: instructions for receiving, by a processor of a first party, encrypted second secret data $[\![y]\!]$ from a second party, wherein where $\ell$ is the number of bits in y and wherein $[\![y]\!]$ denotes the additive homomorphic encryption of y; instructions for choosing a random mask $\rho$ in $\{0,1\}^{\ell+\kappa}$, where $\kappa$ is a security parameter; instructions for computing $[\![z^\dagger]\!] = [\![y]\!] \cdot [\![x]\!]^{-1} \cdot [\![2^\ell + \rho]\!]$, wherein x is the first secret data having $\ell$ bits; instructions for sending $[\![z^\dagger]\!]$ to the second party; instructions for computing $x' = \rho \bmod 2^\ell$; instructions for receiving, by the processor of a first party, $\ell$ encrypted bits of y' from the second party, wherein y' is based upon $[\![z^\dagger]\!]$; instructions for computing the Hamming weight h of x'; instructions for computing the value of a first comparison bit $\delta'_A$ such that $\delta'_A = 0$ when $h > \lfloor \ell/2 \rfloor$, $\delta'_A = 1$ when $h < \lceil \ell/2 \rceil$, and $\delta'_A$ is randomly selected when $h = \ell/2$; instructions for forming a set of $\lfloor \ell/2 \rfloor$ indexes $\mathcal{L}$ that includes at least the indexes i where $x'_i = \delta'_A$; instructions for selecting random invertible scalars $r_i$ for each i in $\mathcal{L}$ and computing $[\![c_i^*]\!] = ([\![1+(1-2\delta'_A)x'_i]\!] \cdot [\![y'_i]\!]^{2\delta'_A - 1} \cdot (\Pi_{j=i+1}^{\ell-1} [\![x'_j \oplus y'_j]\!]))^{r_i}$; instructions for selecting random invertible scalars $r_{-1}$ and computing $[\![c^*_{-1}]\!] = (\delta'_A) \cdot \Pi_{j=0}^{\ell-1} [\![x'_j \oplus y'_j]\!])^{r_{-1}}$; instructions for transmitting ciphertexts $[\![c_i^*]\!]$ in a random order to the second party.

Various embodiments are described, wherein when the second party decrypts $[\![z^\dagger]\!]$ and defines $y' = z^\dagger \mod 2^\ell$.

Various embodiments are described, wherein the first party sets $\delta_A = \delta'_A$ when $\lfloor \rho/2^\ell \rfloor$ is even, and $\delta_A = 1 - \delta'_A$ otherwise, second party sets a value of a second comparison bit $\delta_B = \delta'_B$ when $\lfloor z^\dagger/2^\ell \rfloor$ is odd, and $\delta_B = 1 - \delta'_B$ otherwise and wherein $\delta_A \oplus \delta_B = [x \leq y]$.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
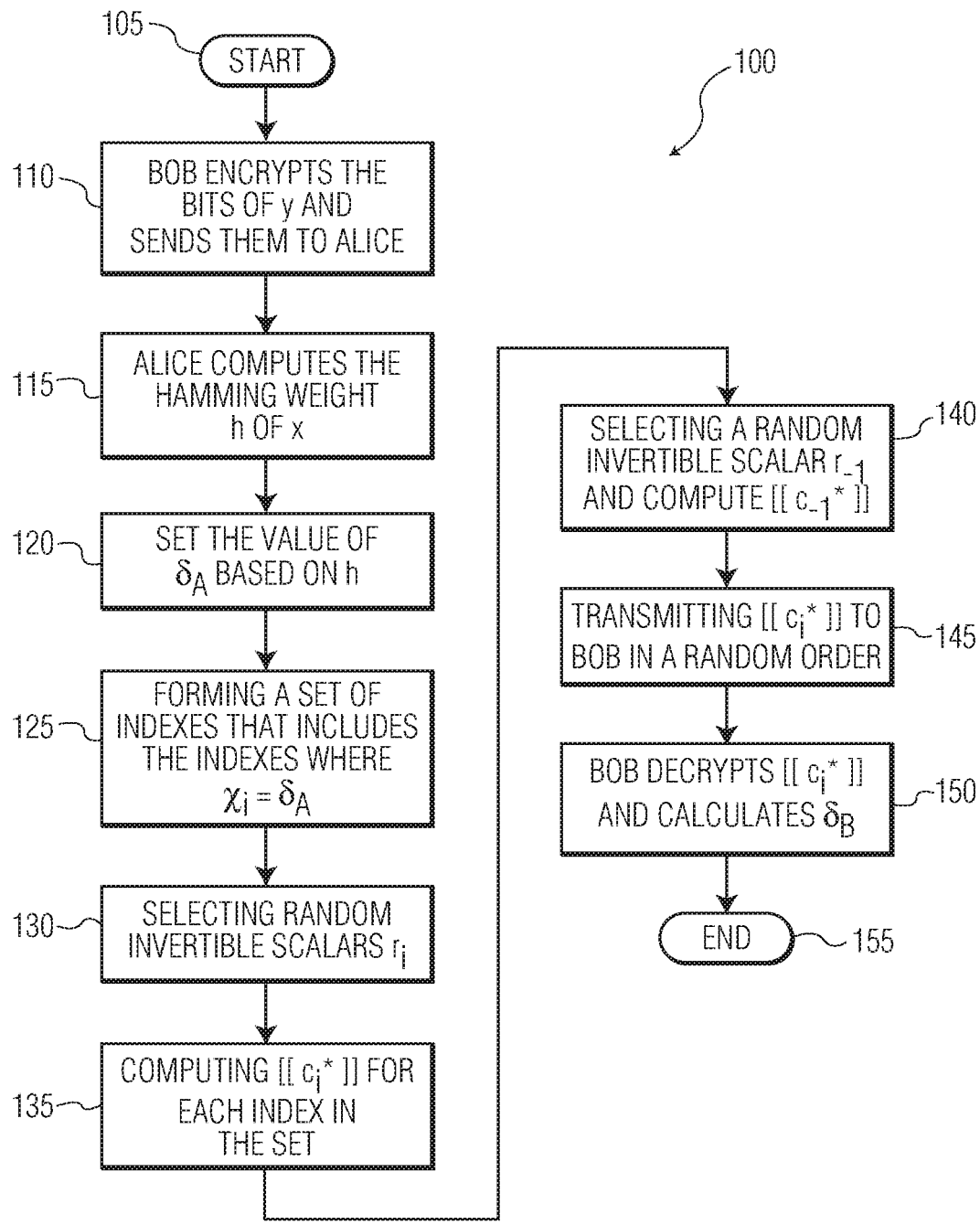
FIG. 1 illustrates a first embodiment of a privacy comparison protocol.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

A comparison compares two $\ell$-bit integers to decide whether or not $x \leq y$. This problem arises in a variety of privacy-preserving applications including secure data mining and secure auctions.

There exist different versions of the problem depending on whether the numbers x and y are known to the respective parties or unknown to everyone, and whether the result of the comparison is public or private. In this disclosure, it is assumed that two parties have two integers (in the clear) and that they want to compare these numbers without revealing the value. Embodiments of the comparison protocol described below can also be used in the case where one of the parties has the encrypted integers and the other party has the key to decrypt encrypted integers and in this case both integers will remain unknown to the parties. The final result of the comparison protocol can be public or secretly shared between the parties.

The embodiments of the disclosure introduce new comparison protocols which increase the efficiency in both communication and computational complexities by about a factor of two as compared to the current state of the art. These embodiments include the following features:

Performing the comparison based on the Hamming weight of the integer x. These embodiments are designed in a way that guarantees having at most $$\left\lfloor \frac{\ell}{2} \right\rfloor + 1$$

bit comparisons, which leads to a better performance.

The protocols are cryptographically secure. By possibly adding dummy comparisons, the protocols become robust against timing attacks as well.

In order to hide the information of Hamming weight of x from the other party, a sub-protocol is introduced that generates random shares and compares those shares.

The protocols described may be applied to increase the efficiency of any comparison protocol based on bit-wise comparison. See e.g., Hsiao-Ying Lin and Wen-Guey Tzeng. An efficient solution to the millionaires' problem based on homomorphic encryption. In J. Ioannidis, A. D. Keromytis, and M. Yung, editors, *Applied Cryptography and Network Security* (ACNS 2005), volume 3531 of Lecture Notes in Computer Science, pages 456-466. Springer, 2005. In order to provide a concrete example in the embodiments described herein the well-known DGK comparison protocol is used. See Ivan Damgård, Martin Geisler, and Mikkel Krøigaard, Homomorphic encryption and secure comparison, *International Journal of Applied Cryptography*, 1(1):22-31, 2008.

Damgård, Geisler, and Krøigaard present an elegant protocol for comparing private values. It was later modified in: Zekeriya Erkin, Martin Franz, Jorge Guajardo, Stefan Katzenbeisser, Inald Lagendijk, and Tomas Toft, Privacy-preserving face recognition, In I. Goldberg and M. J. Atallah, editors, *Privacy Enhancing Technologies* (PETS 2009), volume 5672 of Lecture Notes in Computer Science, pages 235-253. Springer, 2009; and Thijs Veugen. Improving the DGK comparison protocol, In 2012 *IEEE International Workshop on Information Forensics and Security* (WIFS 2012), pages 49-54. IEEE, 2012.

The comparison protocol utilizes an additively homomorphic encryption scheme. Let $[\![m]\!]$ denote the encryption of a message m. The homomorphic property implies that for any two messages m and m', the encryption of m+m' can be obtained from the encryptions of m and m' as $[\![m+m']\!] = [\![m]\!] \cdot [\![m']\!]$ for some public operation "·". Likewise, for a known constant integer d, the encryption of dm (that is, m+m+ . . . +m (d times)) can be obtained from the encryption of m as $[\![dm]\!] = [\![m]\!]^d$. Examples of additively homomorphic encryption schemes include the Paillier cryptosystem or the exponential variant of the ElGamal encryption scheme.

The DGK+ protocol, a variation on the Damgård-Geisler-Krøigaard protocol, will now be described. Alice possesses a private $\ell$-bit value $x = \sum_{i=0}^{\ell-1} x_i 2^i$ while Bob possesses a private $\ell$-bit value $y = \sum_{i=0}^{\ell-1} y_i 2^i$. The goal for Alice and Bob is to respectively obtain bits $\delta_A$ and $\delta_B$ such that $\delta_A \oplus \delta_B = [x \leq y]$. Here $[x \leq y]$ denotes the result of the comparison: $[x \leq y] = 1$ (true) if $x \leq y$, and $[x \leq y] = 0$ (false) if $x > y$. The protocol proceeds in four steps:

1. Bob encrypts the bits of $y = \sum_{i=0}^{\ell-1} y_i 2^i$ under his public key and sends $[\![y_i]\!]$, $0 \leq i \leq \ell-1$, to Alice.
2. Alice chooses uniformly at random a bit $\delta_A \in \{0,1\}$ and defines $s = 1 - 2\delta_A$. Alice also selects $\ell+1$ random invertible scalars $r_i$, $-1 \leq i \leq \ell-1$.
3. Next, for $\ell-1 \geq i \geq 0$, Alice computes $$[\![c^*_i]\!] = ([\![s]\!] \cdot [\![x_i]\!] \cdot [\![y_i]\!]^{-1} \cdot (\prod_{j=i+1}^{\ell-1} [\![x_j \oplus y_j]\!])^3)_{r_i}$$

Finally, Alice computes $$[\![c^*_{-1}]\!] = ([\![\delta_A]\!] \cdot \prod_{j=0}^{\ell-1} [\![x_j \oplus y_j]\!])^{r_{-1}}.$$

Alice sends the $\ell+1$ ciphertexts $c_i^*$ in a random order to Bob.

4. Using his private key, Bob decrypts the received $[\![c_i^*]\!]$'s. If one is decrypted to zero, Bob sets $\delta_B = 1$. Otherwise, Bob sets $\delta_B = 0$.

Note that given $[\![y_i]\!]$, Alice can obtain $[\![x_i \oplus y_i]\!]$ as $$[\![x_i \oplus y_i]\!] = \begin{cases} [\![y_i]\!] & \text{if } x_i = 0 \\ [\![1]\!] \cdot [\![y_i]\!]^{-1} & \text{if } x_i = 1 \end{cases}.$$

The correctness of the DGK+ protocol follows from the fact that $x = (x_{\ell-1}, \ldots, x_0)$ is smaller than or equal to $y = (y_{\ell-1}, \ldots, y_0)$ if only and only if 1. $x = y$, or
2. there exists some index $i$, with $0 \leq i \leq \ell-1$, such that $x_i < y_i$, and $x_j = y_j$ for $\ell - 1 \geq j \geq i + 1$.

When $x \neq y$, this latter condition is equivalent to the existence of some index $i$, with $0 \leq i \leq \ell-1$, such that $x_i - y_i + 1 + \sum_{j=i+1}^{\ell-1}(x_j \oplus y_j) = 0$. Indeed, because $(x_i - y_i + 1) \geq 0$ and $(x_j \oplus y_j) \geq 0$, it follows that $x_i - y_i + 1 + \sum_{j=i+1}^{\ell-1}(x_j \oplus y_j) = 0$ is equivalent to $x_i - y_i + 1 = 0$ and $(x_j \oplus y_j) = 0$ for all $j \geq i+1$, which in turn is equivalent to $x_i < y_i$ and $x_j = y_j$ for all $j \geq i+1$.

Let $\delta_A \in \{0,1\}$. The above test is replaced to allow the secret sharing of the comparison bit across Alice and Bob as $[x \leq y] = \delta_A \oplus \delta_B$. The new test checks the existence of some index $i$, with $0 \leq i \leq \ell-1$, such that $$c_i = x_i - y_i + (1 - 2\delta_A) + 3\sum_{j=i+1}^{\ell-1}(x_j \oplus y_j)$$

is zero. When $\delta_A = 0$ this occurs if $x \leq y$; when $\delta_A = 1$ this occurs if $x > y$. As a result, the first case yields $\delta_A = \neg[x < y] = 1 \oplus [x \leq y]$ while the second case yields $\delta_A = [x > y] = \neg[x \leq y] = 1 \oplus [x \leq y]$. This discrepancy is corrected by augmenting the set of $c_i$'s with an additional value $c_{-1}$ given by $$c_{-1} = \delta_A + \sum_{j=0}^{\ell-1}(x_j \oplus y_j).$$

It is worth observing that $c_{-1}$ can only be zero when $\delta_A = 0$ and $x = y$. Therefore, in all cases, when there exists some index $i$, with $-1 \leq i \leq \ell-1$, such that $c_i = 0$, then $\delta_A = 1 \oplus [x \leq y]$, or equivalently, $[x \leq y] = \delta_A \oplus 1$.

It is easily verified that $[\![c_i^*]\!]$ as computed in step 3 of the DGK+ protocol is the encryption of $r_i c_i$. Clearly, if $r_i c_i$ is zero then so is $c_i$ because $r_i \neq 0$. Hence, if one of the $[\![c_i^*]\!]$'s decrypts to 0 then $[x \leq y] = \delta_A \oplus 1 = \delta_A \oplus \delta_B$; if not, one has $[x \leq y] = \delta_A \oplus \delta_B$. This concludes the proof of correctness.

In section II-A of Veugen, the author does not explicitly mention that $c_{-1}$ has to be randomized by an invertible scalar $r_{-1}$. This step is important as otherwise, assuming $\delta_A = 1$ (which occurs with probability ½), if Bob decrypts one of the $[\![c_i^*]\!]$'s to 1, he can deduce that $x$ is very likely equal to $y$.

The Damgård-Geisler-Krøigaard (DKG) protocol has the disadvantage of being computational intensive. Step 3 of the DKG protocol is dominated by $\ell+1$ exponentiations in the group underlying the homomorphic encryption scheme. Those are costly operations. This issue was addressed in Veugen. Veugen was able to divide the computational workload by approximately a factor of two. However, the resulting implementation is subject to timing attacks. Another drawback of the DKG protocol is the communication cost. Step 3 in the DKG protocol produces $\ell+1$ ciphertexts that are transmitted from Alice to Bob.

An embodiment of a comparison method will now be described that reduces by roughly a factor of two both the computational complexity and the necessary bandwidth for step 3. Furthermore, provided it is properly implemented, the proposed method is resistant against timing attacks.

The same setting as described above will be used again where Alice possesses an $\ell$-bit integer $x$ and Bob possesses an $\ell$-bit integer $y$. The goal is for Alice and Bob to respectively obtain bits $\delta_A$ and $\delta_B$ such that $\delta_A \oplus \delta_B = [x \leq y]$.

A first embodiment of the privacy comparison protocol, as illustrated in FIG. 1, proceeds as follows.

1. Bob encrypts the bits of $y = \sum_{i=0}^{\ell-1} y_i 2^i$ under his public key and sends $[\![y_i]\!]$, $0 \leq i \leq \ell-1$, to Alice 110.
2. Alice computes the Hamming weight of $x$ (i.e., the number of nonzero bits of $x$) 115. Let $h$ denote the Hamming weight of $x$. The value of $\delta_A$ is set based upon the Hamming weight $h$ 120. There are three cases to consider:
   (a) if $h > \lfloor \ell/2 \rfloor$, Alice sets $\delta_A = 0$;
   (b) if $h < \lceil \ell/2 \rceil$, Alice sets $\delta_A = 1$;
   (c) if $h = \ell/2$ (this can only occur when $\ell$ is even), Alice chooses a random value in $\{0,1\}$ for $\delta_A$.
3. Next, Alice forms a set $\mathcal{L}$ of indexes $i$ 125 such that
   (a) $\mathcal{L} \supseteq \mathcal{L}'$ where $\mathcal{L}' = \{0 \leq i \leq \ell-1 | x_i = \delta_A\}$; and
   (b) $\#\mathcal{L} = \lfloor \ell/2 \rfloor$.

For each $i \in \mathcal{L}$, Alice selects a random invertible scalar $r_i$ 130 and computes 135

$$[\![c_i^*]\!] = ([\![1+(1-2\delta_A)x_i]\!] \cdot [\![y_i]\!]^{2\delta_A - 1} \cdot (\prod_{j=i+1}^{\ell-1} [\![x_j \oplus y_j]\!]))^{r_i}.$$

Finally, Alice computes 140

$$[\![c^*_{-1}]\!] = ([\![\delta_A]\!] \cdot \prod_{j=0}^{\ell-1} [\![x_j \oplus y_j]\!])^{r_{-1}}.$$

Alice sends the $\lfloor \ell/2 \rfloor + 1$ ciphertexts $[\![c_i^*]\!]$ in a random order to Bob 145.

4. Using his private key, Bob decrypts the received $[\![c_i^*]\!]$'s. If one is decrypted to zero, Bob sets $\delta_B = 1$ 150. Otherwise, Bob sets $\delta_B = 0$.

The correctness of this protocol will now be discussed. It is useful to introduce some notation. For a t-bit integer $a = \sum_{i=0}^{t-1} a_i 2^i$ with $a_i \in \{0,1\}$, let $\bar{a}$ denote the complementary of $a$; i.e., $\bar{a} = 2^t - a - 1$. In particular, for $t=1$, $a = a_0$ and $\bar{a} = \bar{a}_0 = 1 - a_0$.

As a first proposition let $x = \sum_{i=0}^{\ell-1} x_i 2^i$ and $y = \sum_{i=0}^{\ell-1} y_i 2^i$, with $x_i, y_i \in \{0,1\}$, be two $\ell$-bit integers. Define $$c_i = x_i + \overline{y_i} + \sum_{j=i+1}^{\ell-1} (x_j \oplus y_j).$$

Then $x<y$ if and only if there exists some unique index $i$ with $0 \leq i \leq \ell-1$ such that $c_i=0$.

This may be proved as follows. As defined, $c_i$ is the sum of nonnegative terms. Therefore, $c_i=0$ is equivalent to (i) $x_i=\overline{y_i}=0$ and (ii) for $i+1 \leq j \leq \ell-1$, $x_j \oplus y_j=0$. This in turn is equivalent to (i) $x_i<y_i$ and (ii) for $i+1 \leq j \leq \ell-1$, $x_j=y_j$; that is, $x<y$. To see that if an index $i$ exists, such that $c_i=0$ is unique, suppose that $c_{i'}=0$ for some $i' \neq i$. Without loss of generality, assume that $i'<i$. Then, $c_{i'}=x_{i'}+\overline{y_{i'}}+\sum_{j=i'+1}^{\ell-1}(x_j \oplus y_j) \geq x_i \oplus y_i = 1$, which is a contradiction.

As second proposition, let $x=\sum_{i=0}^{\ell-1} x_i 2^i$ and $y=\sum_{i=0}^{\ell-1} y_i 2^i$, with $x_i, y_i \in \{0,1\}$, be two $\ell$-bit integers. Define $$c_{-1} = \sum_{j=0}^{\ell-1} (x_j \oplus y_j).$$

Then $x=y$ if and only if $c_{-1}=0$. The proof is obvious.

By reversing the roles of $x$ and $y$ in the first proposition, the following corollary results: as a third proposition let $x=\sum_{i=0}^{\ell-1} x_i 2^i$ and $y=\sum_{i=0}^{\ell-1} y_i 2^i$, with $x_i, y_i \in \{0,1\}$, be two $\ell$-bit integers. Define $$c_i = y_i + \overline{x_i} + \sum_{j=i+1}^{\ell-1} (y_j \oplus x_j).$$

Then $x \leq y$ if and only if there exists no index $i$ with $0 \leq i \leq \ell-1$ such that $c_i=0$.

This may be proved as follows. If there were such an index $i$, this would imply $y<x$ by the first proposition. The absence of such an index therefore implies $y \geq x$.

Suppose first that the Hamming weight of $x$ is greater than $\lfloor \ell/2 \rfloor$ (and thus $\delta_A=0$). This means that $x$ has more ones than zeros in its binary representation. Specifically, among the $\ell$ bits of $x$, at most $\lfloor \ell/2 \rfloor$ bits are equal to 0. Furthermore, the first proposition shows that $c_i$ needs only to be evaluated when $x_i=0$ because when $x_i=1$, it is already known that the corresponding $c_i$ cannot be zero. The case $x=y$ is taken into account using the second proposition.

Now suppose that the Hamming weight of $x$ is less than $\lceil \ell/2 \rceil$ (and thus $\delta_A=1$). In this case, among the $\ell$ bits of $x$, at most $\lfloor \ell/2 \rfloor$ bits are equal to 1. Then the second proposition can be made use of: with at most $\lfloor \ell/2 \rfloor$ tests for $c_i=0$ (i.e., when $x_i=1$), it can be decided whether $x \leq y$.

The last case is when the Hamming weight of $x$ is $\ell/2$ (and thus $\delta_A$ is equiprobably equal to 0 or 1). This supposes $\ell$ even. In this case, among the $\ell$ bits of $x$, $\ell/2$ bits are equal to 0 and $\ell/2$ bits are equal to 1. The combination of the first and second propositions or the third proposition can be used indifferently to decide after at most $\ell/2 = \lfloor \ell/2 \rfloor$ tests for $c_i=0$ whether or not $x \leq y$.

The above analysis shows that (i) only the indexes $i \in \mathcal{L}'$ need to be tested, and (ii) $\# \mathcal{L}' \leq \lfloor \ell/2 \rfloor$. If $\# \mathcal{L}' < \lfloor \ell/2 \rfloor$ then additional indexes are added to $\mathcal{L}'$ to form $\mathcal{L}$. This ensures that $\# \mathcal{L}$ is always equal to $\lfloor \ell/2 \rfloor$ and is aimed at preventing timing attacks. Since the values of $r_i c_i$ is nonzero for $i \notin \mathcal{L}'$, the correctness follows by noting that the $c^*_i$'s include the encryptions of $r_i c_i$ for all $i \in \mathcal{L}'$.

By construction, $\delta_B=1$ if one of the $[\![ c^*_i ]\!]$'s decrypts to 0.

1. When $\delta_A=0$, the first and second propositions are used. A decryption to 0 means $x \leq y$, and therefore $[x \leq y]=1=\delta_A \oplus \delta_B$, as desired.
2. When $\delta_A=1$, the third proposition is used and a decryption to 0 means $x \leq y$. Then, $[x \leq y]=0=\delta_A \oplus \delta_B$, as desired.

If none of the $[\![ c^*_i ]\!]$'s decrypts to 0, then $\delta_B=0$. When $\delta_A=0$, this means $x \leq y$; when $\delta_A=1$, this means $x \leq y$. In both cases, $[x \leq y]=\delta_A \oplus \delta_B$, as desired.

A second embodiment of a comparison method will now be described. In the setting where Alice possesses $x$ and Bob $y$ and where Alice and Bob wish to respectively obtain $\delta_A$ and $\delta_B$ such that $\delta_A \oplus \delta_B=\sigma$ with $\delta=[x \leq y]$, the previously described first protocol needs special care. In particular, it requires that the Hamming weight of $x$ a priori has the same probability to be greater than $\lfloor \ell/2 \rfloor$ or less than $\lceil \ell/2 \rceil$. This guarantees that $\delta_A$ is uniformly distributed over $\{0,1\}$. Indeed, if Bob knows for example that the Hamming weight of $x$ is more likely greater than $\lfloor \ell/2 \rfloor$ (and thus $\delta_A$ is more likely equal to 1), a value $\delta_B=0$ tells Bob that $x$ is more likely less or equal to $y$ because $\delta_A \oplus \delta_B=[x \leq y]$.

The second embodiment described below is secure even when Bob has some a priori knowledge on the Hamming weight of $x$. The distribution of $\delta_A$ will always be uniform over $\{0,1\}$, independently of the value of $x$.

Figure 2:
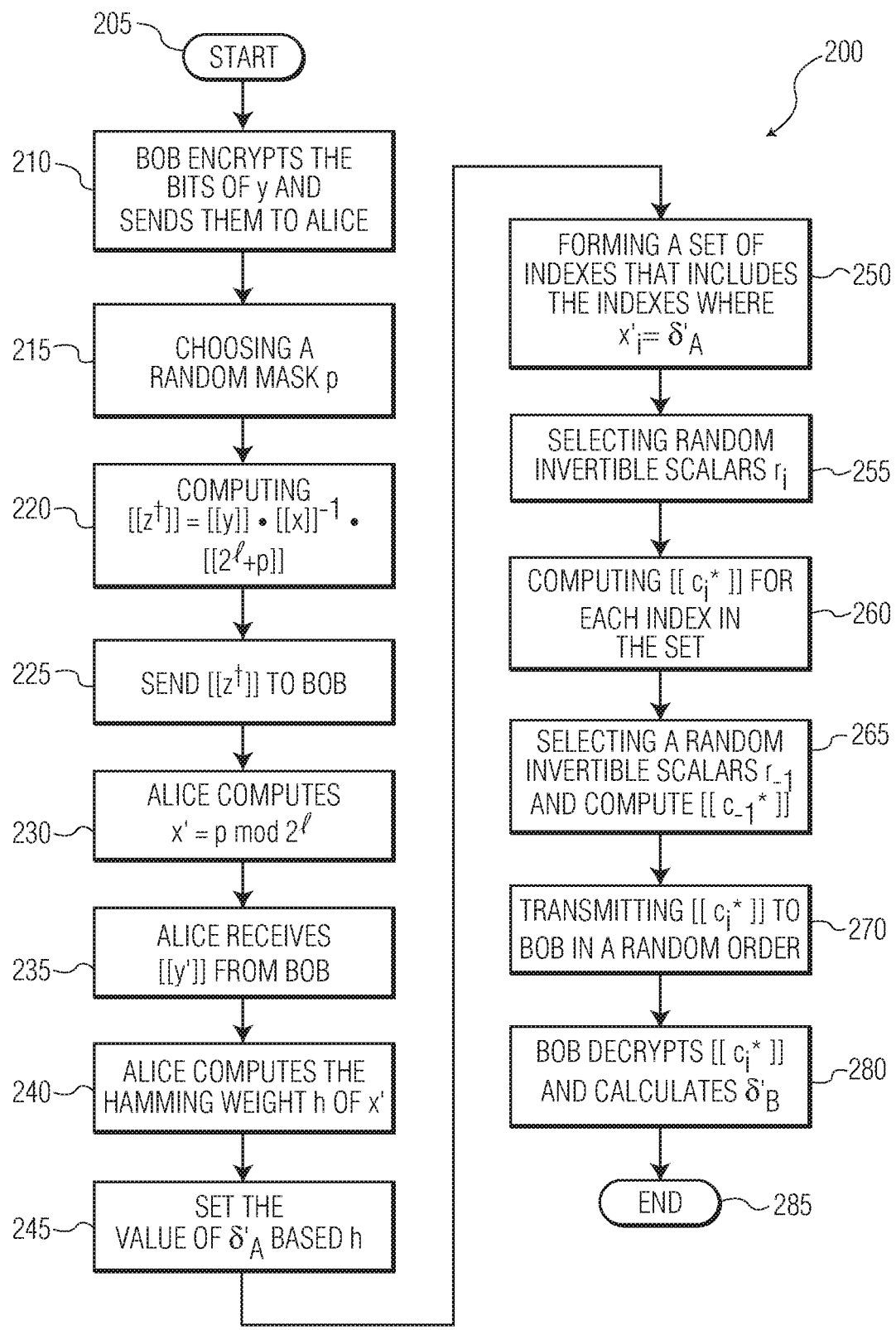
FIG. 2 illustrates a second embodiment of a privacy comparison protocol.

The second embodiment of the privacy comparison protocol, as shown in FIG. 2, proceeds as follows.

1a. Bob encrypts $y$ under his public key and sends $[\![ y ]\!]$ to Alice 210.

1b. Alice chooses a random mask $\rho$ in $\{0,1\}^{\ell+\kappa}$ 215, where $\kappa$ is a security parameter, and computes $[\![ z^\dagger ]\!]=[\![ y ]\!] \cdot [\![ x ]\!]^{-1} \cdot [\![ 2^\ell + \rho ]\!]$ 220, and sends $[\![ z^\dagger ]\!]$ to Bob 225.

1c. Alice defines $x'=\rho \bmod 2^\ell$ 230.

1d. Using his private key, Bob decrypts $[\![ z^\dagger ]\!]$ and gets $z^\dagger$, and defines $y'=z^\dagger \bmod 2^\ell$.

2. Alice and Bob now apply the previous comparison protocol on $x'$ and $y'$ 235-280 (similar to FIG. 1). Let $\delta'_A$ and $\delta'_B$ denote the respective outputs for Alice and Bob of the protocol, with $\delta'_A \oplus \delta'_B=[x' \leq y']$.

3. Alice sets $\delta_A=\delta'_A$ if $\lfloor \rho/2^\ell \rfloor$ is even, and $\delta_A=1-\delta'_A$ otherwise.

4. Bob sets $\delta_B=\delta'_B$ if $\lfloor z^\dagger/2^\ell \rfloor$ is odd, and $\delta_B=1-\delta'_B$ otherwise.

It is worth noting here that $x'$ as defined in Step 3 is a random $\ell$-bit integer. There is therefore no way for Bob to gain more information on its Hamming weight.

The correctness of this protocol will now be discussed.

Define $X'=\lfloor \rho/2^\ell \rfloor$, $Y'=\lfloor z^\dagger/2^\ell \rfloor$, and $\delta'=\delta'_A \oplus \delta'_B$. The values for $\delta_A$ and $\delta_B$ such that $\delta_A \oplus \delta_B=[x \leq y]$ can be obtained from $\delta'_A$ and $\delta'_B$, respectively. Indeed:

$$\delta_A \oplus \delta_B = [x \le y] = \left\lfloor \frac{y + 2^\ell - x}{2^\ell} \right\rfloor$$

$$= \left\lfloor \frac{z^\dagger - \rho}{2^\ell} \right\rfloor = \left\lfloor \frac{(Y'2^\ell + y') - (X'2^\ell + x')}{2^\ell} \right\rfloor = Y' - X' + \left\lfloor \frac{y' - x'}{2^\ell} \right\rfloor$$

$$= Y' - X' + \delta' - 1 == Y' - X' + (\delta'_A \oplus \delta'_B) - 1.$$

Therefore, modulo 2, one has:

$$\delta_A + \delta_B \equiv Y' + X' + \delta'_A + \delta'_B + 1 \pmod{2};$$

a solution of which is: $\delta_A = (\delta'_A + X') \mod 2$ and $\delta_A = (\delta'_B + Y' + 1) \mod 2$.

The first and second embodiments may also produce an encrypted comparison bit as will now be described. Let $\delta$ denote the comparison bit; i.e., $\delta = [x \le y]$. In certain settings, Alice wishes to produce an encryption of $\delta$ at the end of the protocol, rather than a share $\delta_A$ of $\delta$ (the other share, $\delta_B$, being held by Bob). In this case, following step may be added to the first and second embodiments of the comparison protocols:

5. Bob encrypts $\delta_B$ using his public key and sends 〚$\delta_B$〛 to Alice. Upon receiving 〚$\delta_B$〛, Alice computes 〚$\delta$〛 as $$[\![\delta]\!] = \begin{cases} [\![\delta_B]\!] & \text{if } \delta_A = 0, \\ [\![1]\!] \cdot [\![\delta_B]\!]^{-1} & \text{otherwise.} \end{cases}$$

In yet other embodiments, the inputs may be encrypted. There exists another practical setting for the comparison of private inputs. In this setting, Alice possesses 〚$\hat{x}$〛 and 〚$\hat{y}$〛, the encryption of two $\ell$-bit values $\hat{x} = \sum_{i=0}^{\ell-1} \hat{x}_i 2^i$ and $\hat{y} = \sum_{i=0}^{\ell-1} \hat{y}_i 2^i$. Bob possesses the corresponding decryption key. The goal is for Alice to get 〚$\hat{\delta}$〛, the encryption under Bob's public key of the comparison bit $\hat{\delta} = [\hat{x} \le \hat{y}]$. The protocols described in the embodiments above may be used in that setting as well. Let $\kappa$ be a security parameter. Alice first chooses a random ($\ell + \kappa$)-bit integer $\mu$ and, from 〚$\hat{x}$〛 and 〚$\hat{y}$〛, computes 〚$z^*$〛 where $$z^* = \hat{y} \cdot 2^\ell - \hat{x} + \mu$$

as 〚$z^*$〛 = 〚$\hat{y}$〛 · 〚$\hat{x}$〛$^{-1}$ · 〚$2^\ell + \mu$〛. Alice also defines $x = \mu \mod 2^\ell$. Alice sends 〚$z^*$〛 to Bob.

Bob decrypts 〚$z^*$〛 to get $z^*$ and defines $y = z^* \mod 2^\ell$.

Again, it is worth noting that $x$ and $y$ are $\ell$-bit integers privately held by Alice and Bob, respectively. This is a setting similar to the one considered above. Let $\delta = [x \le y]$ and assume that Alice obtained 〚$\delta$〛 as the output of the first or second comparison protocol embodiments. It will be shown below how Alice can get 〚$\hat{\delta}$〛 from 〚$\delta$〛.

Define $X = \lfloor \mu / 2^\ell \rfloor$ and $Y = \lfloor z^*/2^\ell \rfloor$. Note that the problem of finding 〚$\hat{\delta}$〛 boils down to the problem of finding 〚$\delta$〛. Indeed:

$$\hat{\delta} = [\hat{x} \le \hat{y}] = \left\lfloor \frac{\hat{y} + 2^\ell - \hat{x}}{2^\ell} \right\rfloor$$

$$= \left\lfloor \frac{z^* - \mu}{2^\ell} \right\rfloor = \left\lfloor \frac{(Y2^\ell + y) - (X2^\ell + x)}{2^\ell} \right\rfloor = Y - X + \left\lfloor \frac{y - x}{2^\ell} \right\rfloor$$

$$= Y - X + \delta - 1;$$

hence, Alice may compute 〚$\hat{\delta}$〛 from 〚$\delta$〛 and 〚$Y$〛 as $$[\![\hat{\delta}]\!] = [\![Y]\!] \cdot [\![X+1]\!]^{-1} \cdot [\![\delta]\!].$$

It suffices that Bob sends the value of 〚$Y$〛 to Alice.

The embodiments described herein may be used in various applications. The comparison of private values is an essential building block for developing privacy-preserving machine-learning algorithms. These include the very popular SVM (support vector machines) algorithm as well as k-means clustering. In secure clustering algorithm, user profile should be compared with cluster centroids.

Comparison protocols also have a pivotal role in authentication services. In fingerprint-based authentication, a biometric device (fingerprint reader) identifies a user by comparing her sample with the database of authorized entities. It is also used in face recognition. In private recommender systems, the user value is compared with a threshold. Comparison algorithms also have applications in secure matrix factorization, private bio-informatic services, and secure adaptive filtering.

The embodiments described in this disclosure therefore find numerous applications. Remarkably, the resulting performance is greatly improved compared to state-of-the-art methods, both in computation and communication complexities.

The embodiments described herein represent an improvement in the technology of secure comparisons of data by a single party who does not have access to the underlying secure data or between two parties who are keeping their own information secret from the other party. These embodiments provide a reduction in the amount of computations needed to perform these secure comparisons as well as reducing the amount of data that needed to be exchanged between the parties doing the comparison. As a result, the embodiments also lead to an improvement in terms of number of operations of a computer that may be used to carry out such secure comparisons.

The methods described above may be implemented in software which includes instructions for execution by a processor stored on a non-transitory machine-readable storage medium. The processor may include a memory that stores the instructions for execution by the processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for performing a secure comparison between a first secret data and a second secret data, comprising:
   receiving, by a processor of a first party, $\ell$ encrypted bits of the second secret data y from a second party, where $\ell$ is an integer;
   computing the Hamming weight h of first secret data x, wherein x has $\ell$ bits;
   computing the value of a first comparison bit $\delta_A$ such that $\delta_A=0$ when $h>\lfloor \ell/2 \rfloor$, $\delta_A=1$ when $h<\lceil \ell/2 \rceil$, and $\delta_A$ is randomly selected when $h=\ell/2$;
   forming a set of $\lfloor \ell/2 \rfloor$ indexes $\mathcal{L}$ that includes at least the indexes i where $x_i=\delta_A$;
   selecting random invertible scalars $r_i$ for each i in $\mathcal{L}$ and computing
   $$[\![c^*_i]\!] = ([\![1+(1-2\delta_A)x_i]\!] \cdot [\![y_i]\!]^{2\delta_A - 1} \cdot (\prod_{j=i+1}^{\ell-1} [\![x_j \oplus y_j]\!]))^{r_i}$$
   wherein $[\![w]\!]$ denotes the homomorphic encryption of w using a cryptographic key of the second party;
   selecting random invertible scalars $r_{-1}$ and computing
   $$[\![c^*_{-1}]\!] = ([\![\delta_A]\!] \cdot \prod_{j=0}^{\ell-1}[\![x_j \oplus y_j]\!])^{r_{-1}};$$
   transmitting ciphertexts $[\![c^*_i]\!]$ in a random order to the second party.

2. The method of claim 1, wherein when the second party sets a value of a second comparison bit $\delta_B$ based upon the decrypted $c^*_i$'s and wherein $\delta_A \oplus \delta_B = [x \le y]$.

3. The method of claim 2, wherein when the second party sets a second comparison bit $\delta_B=1$ when any one of the decrypted $c^*_i$'s is equal to zero.

4. The method of claim 2, wherein when the second party sets a second comparison bit $\delta_B=0$ when none of the decrypted $c^*_i$'s is equal to zero.

5. The method of claim 1, wherein the encryption uses the Pallier cryptosystem.

6. The method of claim 1, wherein the encryption uses the exponential variant of the ElGamal cryptosystem.

7. The method of claim 1, further comprising receiving an encryption of the second comparison bit $\delta_B$ from the second party and computing $[\![\delta]\!]=[\![\delta_B]\!]$ when $\delta_A=0$ and $[\![\delta]\!]=[\![1]\!]\cdot[\![\delta_B]\!]^{-1}$ when $\delta_A\ne 0$, wherein $\delta=[x \le y]$.

8. A method for performing a secure comparison between a first secret data and a second secret data, comprising:
   receiving, by a processor of a first party, encrypted second secret data $[\![y]\!]$ from a second party, wherein where $\ell$ is the number of bits in y and wherein $[\![y]\!]$ denotes the additive homomorphic encryption of y;
   choosing a random mask $\rho$ in $\{0,1\}^{\ell+\kappa}$, where $\kappa$ is a security parameter;
   computing $[\![z^\dagger]\!]=[\![y]\!]\cdot[\![x]\!]^{-1}\cdot[\![2^\ell + \rho]\!]$, wherein x is the first secret data having $\ell$ bits;
   sending $[\![z^\dagger]\!]$ to the second party;
   computing $x' = \rho \mod 2^\ell$;
   receiving, by the processor of a first party, $\ell$ encrypted bits of y' from the second party, wherein y' is based upon $[\![z^\dagger]\!]$;
   computing the Hamming weight h of x';
   computing the value of a first comparison bit $\delta'_A$ such that $\delta'_A=0$ when $h>\lfloor \ell/2 \rfloor$, $\delta'_A=1$ when $h<\lceil \ell/2 \rceil$, and $\delta'_A$ is randomly selected when $h=\ell/2$;
   forming a set of $\lfloor \ell/2 \rfloor$ indexes $\mathcal{L}$ that includes at least the indexes i where $x'_i=\delta'_A$;
   selecting random invertible scalars $r_i$ for each i in $\mathcal{L}$ and computing
   $$[\![c^*_i]\!] = ([\![1+(1-2\delta'_A)x'_i]\!] \cdot [\![y'_i]\!]^{2\delta'_A - 1} \cdot (\prod_{j=i+1}^{\ell-1} [\![x_j \oplus y_j]\!]))^{r_i};$$
   selecting random invertible scalars $r_{-1}$ and computing
   $$[\![c^*_{-1}]\!] = ([\![\delta'_A]\!] \cdot \prod_{j=0}^{\ell-1}[\![x'_j \oplus y'_j]\!])^{r_{-1}};$$
   transmitting ciphertexts $[\![c^*_i]\!]$ in a random order to the second party.

9. The method of claim 8, wherein when the second party decrypts $[\![z^\dagger]\!]$ and defines $y' = z^\dagger \mod 2^\ell$.

10. The method of claim 8, wherein
    the first party sets $\delta_A = \delta'_A$ when $\lfloor \rho/2^\ell \rfloor$ is even, and $\delta_A = 1-\delta'_A$ otherwise,
    second party sets a value of a second comparison bit $\delta_B = \delta'_B$ when $\lfloor z^\dagger/2^\ell \rfloor$ is odd, and $\delta_B = 1-\delta'_B$ otherwise and wherein $\delta_A \oplus \delta_B = [x \le y]$.

11. A non-transitory machine-readable storage medium encoded with instructions for performing a secure comparison between a first secret data and a second secret data, comprising:
    instructions for receiving, by a processor of a first party, $\ell$ encrypted bits of the second secret data y from a second party, where $\ell$ is an integer;
    instructions for computing the Hamming weight h of first secret data x, wherein x has $\ell$ bits;
    instructions for computing the value of a first comparison bit $\delta_A$ such that $\delta_A=0$ when $h>\lfloor \ell/2 \rfloor$, $\delta_A=1$ when $h<\lceil \ell/2 \rceil$, and $\delta_A$ is randomly selected when $h=\ell/2$;
    instructions for forming a set of $\lfloor \ell/2 \rfloor$ indexes $\mathcal{L}$ that includes at least the indexes i where $x_i=\delta_A$;
    instructions for selecting random invertible scalars $r_i$ for each i in $\mathcal{L}$ and computing
    $$[\![c^*_i]\!] = ([\![1+(1-2\delta_A)x_i]\!] \cdot [\![y_i]\!]^{2\delta_A - 1} \cdot (\prod_{j=i+1}^{\ell-1} [\![x_j \oplus y_j]\!]))^{r_i}$$
    wherein $[\![w]\!]$ denotes the homomorphic encryption of w using a cryptographic key of the second party;
    instructions for selecting random invertible scalars $r_{-1}$ and computing
    $$[\![c^*_{-1}]\!] = ([\![\delta_A]\!] \cdot \prod_{j=0}^{\ell-1}[\![x_j \oplus y_j]\!])^{r_{-1}};$$
    instructions for transmitting ciphertexts $[\![c^*_i]\!]$ in a random order to the second party.

12. The non-transitory machine-readable storage medium of claim 11, wherein when the second party sets a value of a second comparison bit $\delta_B$ based upon the decrypted $c^*_i$'s and wherein $\delta_A \oplus \delta_B = [x \le y]$.

13. The non-transitory machine-readable storage medium of claim 12, wherein when the second party sets a second comparison bit $\delta_B=1$ when any one of the decrypted $c^*_i$'s is equal to zero.

14. The non-transitory machine-readable storage medium of claim 12, wherein when the second party sets a second comparison bit $\delta_B=0$ when none of the decrypted $c^*_i$'s is equal to zero.

15. The non-transitory machine-readable storage medium of claim 11, wherein the encryption uses the Pallier cryptosystem.

16. The non-transitory machine-readable storage medium of claim 11, wherein the encryption uses the exponential variant of the ElGamal cryptosystem.

17. The non-transitory machine-readable storage medium of claim 11, further comprising instructions for receiving an encryption of the second comparison bit $\delta_B$ from the second party and computing $[\![\delta]\!]=[\![\delta_B]\!]$ when $\delta_A=0$ and $[\![\delta]\!]=[\![1]\!]\cdot[\![\delta_B]\!]^{-1}$ when $\delta_A\neq 0$, wherein $\delta=[x\leq y]$.

18. A non-transitory machine-readable storage medium encoded with instructions for performing a secure comparison between a first secret data and a second secret data, comprising:

instructions for receiving, by a processor of a first party, encrypted second secret data $[\![y]\!]$ from a second party, wherein where $\ell$ is the number of bits in y and wherein $[\![y]\!]$ denotes the additive homomorphic encryption of y;

instructions for choosing a random mask $\rho$ in $\{0,1\}^{\ell+\kappa}$, where $\kappa$ is a security parameter;

instructions for computing $[\![z^\dagger]\!]=[\![y]\!]\cdot[\![x]\!]^{-1}\cdot[\![2^\ell+\rho]\!]$, wherein x is the first secret data having $\ell$ bits;

instructions for sending $[\![z^\dagger]\!]$ to the second party;

instructions for computing $x'=\rho \bmod 2^\ell$;

instructions for receiving, by the processor of a first party, $\ell$ encrypted bits of y' from the second party, wherein y' is based upon $[\![z^\dagger]\!]$;

instructions for computing the Hamming weight h of x';

instructions for computing the value of a first comparison bit $\delta'_A$ such that $\delta'_A=0$ when $h>\lfloor\ell/2\rfloor$, $\delta'_A=1$ when $h<\lceil\ell/2\rceil$, and $\delta'_A$ is randomly selected when $h=\ell/2$;

instructions for forming a set of $\lfloor\ell/2\rfloor$ indexes $\mathcal{L}$ that includes at least the indexes i where $x'_i=\delta'_A$;

instructions for selecting random invertible scalars $r_i$ for each i in $\mathcal{L}$ and computing $[\![c^*_i]\!]=([\![1+(1-2\delta'_A)x'_i]\!]\cdot[\![y'_i]\!]^{2\delta'_A-1}\cdot(\prod_{j=i+1}^{\ell-1}[\![x'_j\oplus y'_j]\!]))^{r_i}$;

instructions for selecting random invertible scalars $r_{-1}$ and computing $[\![c^*_{-1}]\!]=(\delta'_A]\!]\cdot\prod_{j=0}^{\ell-1}[\![x'_j\oplus y'_j]\!])^{r_{-1}}$;

instructions for transmitting ciphertexts $[\![c^*_i]\!]$ in a random order to the second party.

19. The non-transitory machine-readable storage medium of claim 18, wherein when the second party decrypts $[\![z^\dagger]\!]$ and defines $y'=z^\dagger \bmod 2^\ell$.

20. The non-transitory machine-readable storage medium of claim 18, wherein the first party sets $\delta_A=\delta'_A$ when $\lfloor\rho/2^\ell\rfloor$ is even, and $\delta_A=1-\delta'_A$ otherwise, second party sets a value of a second comparison bit $\delta_B=\delta'_B$ when $\lfloor z^\dagger/2^\ell\rfloor$ is odd, and $\delta_B=1-\delta'_B$ otherwise and wherein $\delta_A\oplus\delta_B=[x\leq y]$.

* * * * *